United States Patent
Gartner et al.

(12)

(10) Patent No.: US 11,407,051 B2
(45) Date of Patent: Aug. 9, 2022

(54) DEVICE FOR THE ROBOT-ASSISTED MANUFACTURING OF A SUPPORTING STRUCTURE FOR A PASSENGER TRANSPORT SYSTEM

(71) Applicant: INVENTIO AG, Hergiswil (CH)

(72) Inventors: Manfred Gartner, Felixdorf (AT); Richard Schütz, Vienna (AT); Thomas Koukal, Absam (AT)

(73) Assignee: INVENTIO AG, Hergiswil (CH)

( * ) Notice: Subject to any disclaimer, the term of this patent is extended or adjusted under 35 U.S.C. 154(b) by 1004 days.

(21) Appl. No.: 16/083,751

(22) PCT Filed: Mar. 6, 2017

(86) PCT No.: PCT/EP2017/055144
§ 371 (c)(1),
(2) Date: Sep. 10, 2018

(87) PCT Pub. No.: WO2017/153314
PCT Pub. Date: Sep. 14, 2017

(65) Prior Publication Data
US 2019/0126377 A1    May 2, 2019

(30) Foreign Application Priority Data
Mar. 10, 2016  (EP) .................................. 16159640

(51) Int. Cl.
*B23K 9/00*  (2006.01)
*B66B 23/00*  (2006.01)
(Continued)

(52) U.S. Cl.
CPC ............ *B23K 9/0026* (2013.01); *B23K 9/025* (2013.01); *B23K 37/0229* (2013.01);
(Continued)

(58) Field of Classification Search
CPC ...... B25J 11/005; B23K 9/0026; B23K 9/025; B23K 37/0229; B23K 37/04; B23K 2201/24; B66B 23/00; B65G 21/02
(Continued)

(56) References Cited

U.S. PATENT DOCUMENTS

| 4,832,169 A * | 5/1989 | Goto ...................... B65G 21/02 53/446 |
| 7,703,594 B2 * | 4/2010 | Stein ....................... B66B 23/00 198/321 |

(Continued)

FOREIGN PATENT DOCUMENTS

| CN | 201333595 | 10/2009 |
| CN | 201335955 Y | 10/2009 |

(Continued)

OTHER PUBLICATIONS

Database WPI Week 200977, Thomson Scientific, London, GB; AN 2009-R26074, XP002760795.
(Continued)

*Primary Examiner* — James R Bidwell
(74) *Attorney, Agent, or Firm* — Knobbe Martens Olson & Bear LLP

(57) ABSTRACT

The application relates to a device and to an assembly line for producing a supporting structure for a passenger transport system, such as an escalator, which have a sequential arrangement of semi- or fully automatically operating and mutually cooperating assembly stations and a sequential order of assembly steps. Each of the assembly stations can include at least one holding device and at least a welding robot as well as, optionally, at least one handling robot. The assembly stations are configured in such a way that intermediate products can be produced efficiently by respective assembly steps. Each can be coordinated with a subsequent assembly station, so that the intermediate products can be
(Continued)

passed sequentially with optimized short cycle times from assembly station to assembly station, to be able to provide a finished, load-bearing supporting structure at the end of the sequence.

17 Claims, 10 Drawing Sheets

(51) Int. Cl.
    *B23K 37/04* (2006.01)
    *B23K 37/02* (2006.01)
    *B23K 9/025* (2006.01)
    *B25J 11/00* (2006.01)
    *B65G 21/02* (2006.01)
    *B23K 101/24* (2006.01)

(52) U.S. Cl.
    CPC ............. *B23K 37/04* (2013.01); *B25J 11/005* (2013.01); *B66B 23/00* (2013.01); *B23K 2101/24* (2018.08); *B65G 21/02* (2013.01)

(58) Field of Classification Search
    USPC ...................................... 198/860.1, 321, 326
    See application file for complete search history.

(56) References Cited

U.S. PATENT DOCUMENTS

| | | | | |
|---|---|---|---|---|
| 8,950,568 | B2* | 2/2015 | Casielles Estrada | ........................ B66B 23/147 198/584 |
| 9,038,806 | B2* | 5/2015 | Makimattila | ........... B66B 23/14 198/321 |
| 9,440,820 | B2* | 9/2016 | Sullivan | ................... B66B 31/00 |
| 10,562,133 | B2* | 2/2020 | Gartner | ................... B23K 31/02 |
| 2002/0175039 | A1* | 11/2002 | Fargo | ...................... B66B 23/00 198/336 |
| 2003/0116402 | A1* | 6/2003 | Krampl | ................... B66B 23/00 198/321 |
| 2007/0216133 | A1 | 9/2007 | Klein et al. | |
| 2016/0376128 | A1* | 12/2016 | González Pantiga | ... B66B 23/00 198/321 |

FOREIGN PATENT DOCUMENTS

| | | | | |
|---|---|---|---|---|
| CN | 203143899 | U | 8/2013 | |
| CN | 203804432 | | 9/2014 | |
| CN | 104684836 | A | 6/2015 | |
| CN | 108098196 | * | 6/2018 | ............. B25J 11/00 |
| CN | 110449785 | * | 11/2019 | ............. B23K 37/00 |
| EP | 1 795 487 | B1 | 2/2010 | |
| EP | 1 795 488 | B1 | 4/2010 | |
| EP | 1 795 489 | B1 | 9/2010 | |
| EP | 2511441 | A1 | 10/2014 | |
| JP | H07247087 | A | 9/1995 | |
| WO | WO 2011/073708 | A1 | 6/2011 | |

OTHER PUBLICATIONS

Database WPI Week 201479, Thomson Scientific, London, GB; AN 2014-V41280, XP002760796.

International Search Report for International Application No. PCT/EP2017/055144 dated May 30, 2017.

* cited by examiner

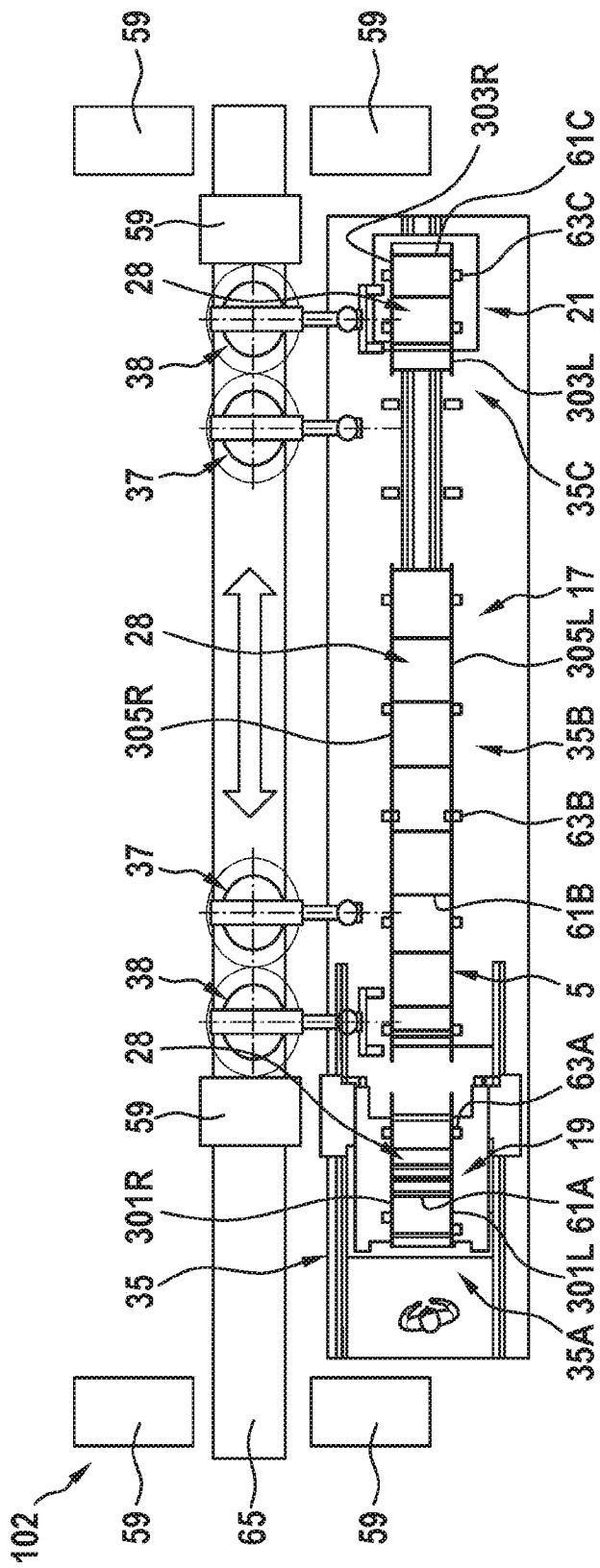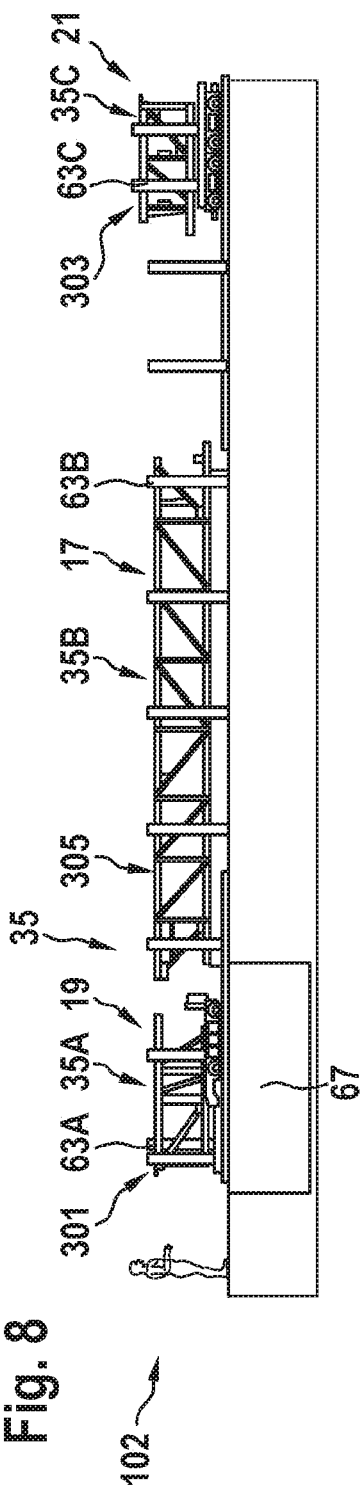

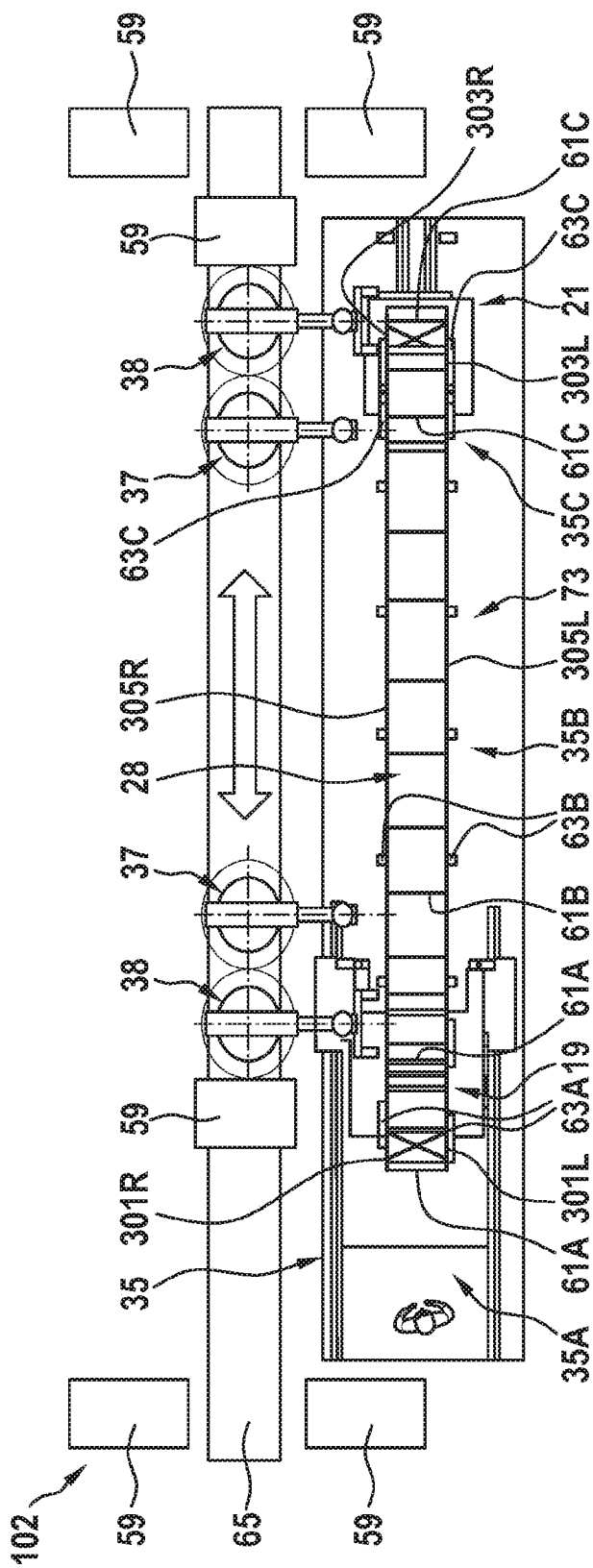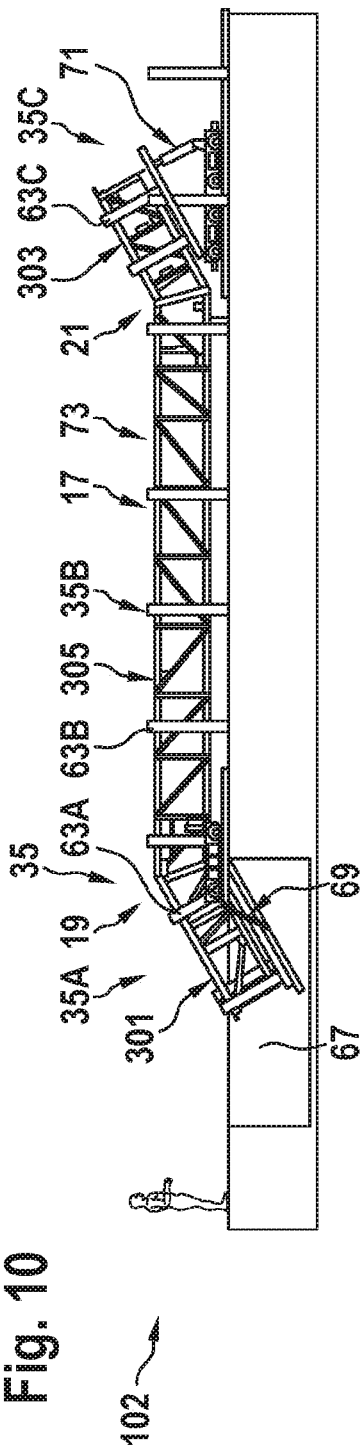

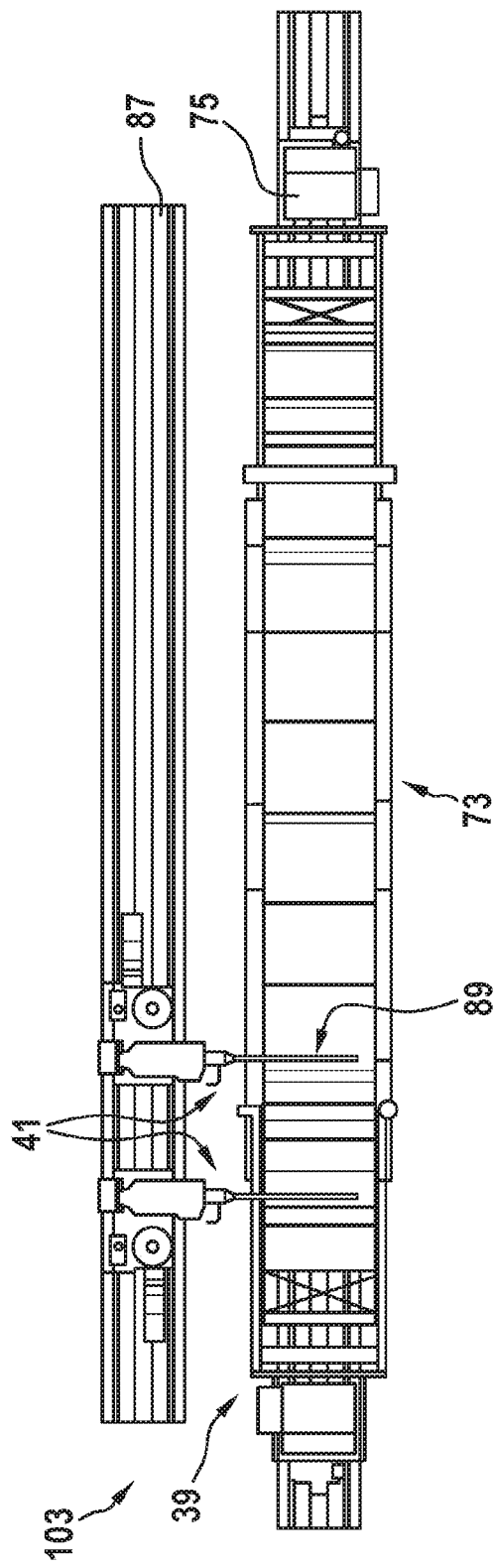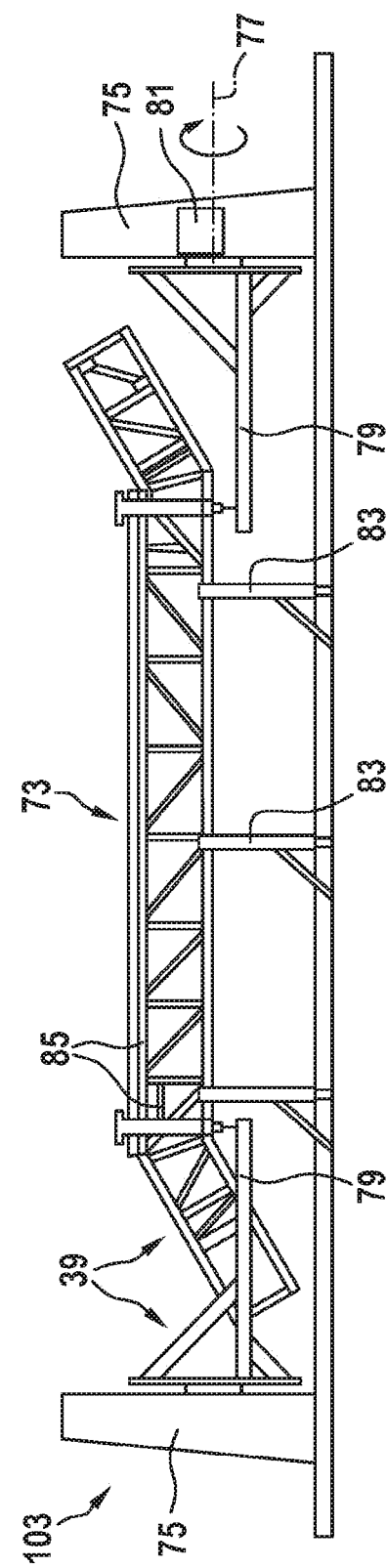

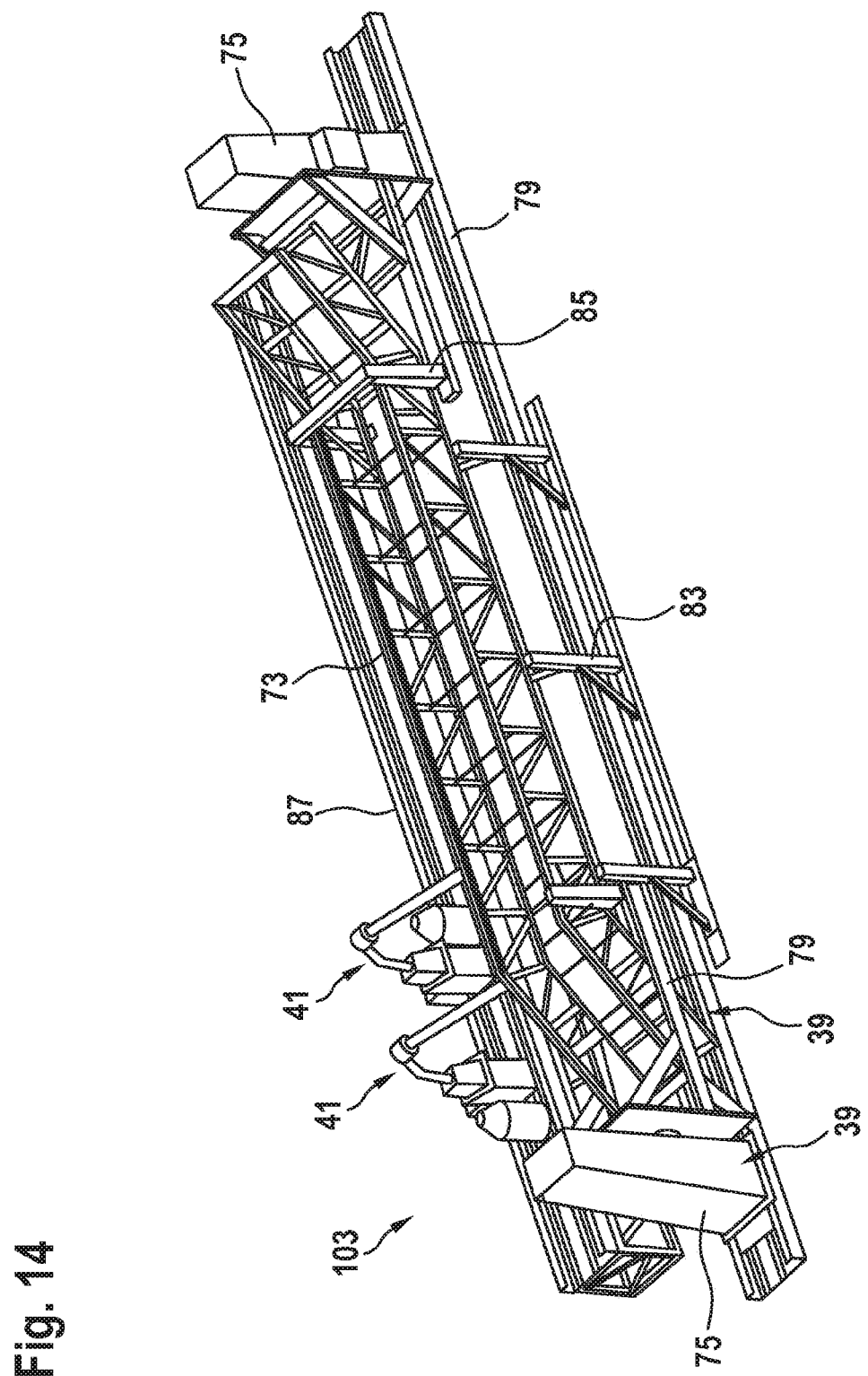

DEVICE FOR THE ROBOT-ASSISTED MANUFACTURING OF A SUPPORTING STRUCTURE FOR A PASSENGER TRANSPORT SYSTEM

TECHNICAL FIELD

The present invention relates to a device for manufacturing a supporting structure for a passenger transport system, such as, for example, an escalator or a moving walkway.

SUMMARY

Passenger transport systems are used in order to transport people, for example, in buildings between different height levels or within the same height level. Escalators, which are also known as rolling staircases, for example, are regularly used to transport people, for example, from one floor to another floor in a building. Moving walkways can be used to transport people, for example, within a floor on a horizontal plane or on an only slightly inclined plane.

Passenger transport systems generally have a supporting structure, which serves as a load-bearing structure. The structure is designed so as to absorb more static and dynamic forces acting on the passenger transport system, such as the weight forces of transported persons, through forces acting on the drive system of the passenger transport system and the like, and, for example, to transfer these forces to the supporting structure of the building accommodating the passenger transport system. For this purpose, the passenger transport system can be mounted and fixed on suitably formed bearing points on the building. Depending on the configuration, the supporting structure may extend, for example, through two or more levels or floors in the building and/or over shorter or longer distances within the same floor in the building.

A supporting structure supported at the bearing points of the building in the mounted state can accommodate both movably and stationary arranged components of a passenger transport system. Depending on the configuration of a passenger transport system such as an escalator or a moving walkway, such components may be formed, for example, as a step belt, pallet belt, deflection axle, drive shaft, drive motor, transmission, control, monitoring system, security system, balustrade, comb plate, bearing point, treadmill and/or guide rail.

For stability reasons and weight reasons, supporting structures for passenger transport systems are usually designed as a frame-work structure. A frame-work forming a supporting structure, generally comprises at least three parts or segments, which are hereinafter referred to as a lower part, a middle part and an upper part. In the case where the supporting structure is to serve to support an escalator, the lower part and the upper part are each generally provided as horizontally arranged parts, wherein the lower part, for example, can be arranged in a lower-lying region of a building, and the upper part in a higher region of the building. The middle part, in this case, connects the lower part and the upper part, and for this purpose, extends generally at an oblique angle to the horizontal line through the building.

It is noted, however, that the terms lower, middle and upper parts herein are not necessarily to be interpreted as a geometrical arrangement within a building. For example, these parts can be arranged, in the case where the supporting structure is provided for a horizontally extending moving walkway, even in an even plane, one behind the other and adjacent to each other.

A frame-work forming a supporting structure, including its lower part, middle part, and upper part, is generally composed of a plurality of interconnected load-bearing frame-work components. Such frame-work components can comprise, for example, so-called upper straps and lower straps as well as cross-braces, diagonal-braces interconnecting these straps, and/or stayer. Further, additional structures such as, inter alia, gusset plates, angle plates, holding plates, oil pan plates, soffit plates, etc., may be provided.

In order to be able to ensure sufficient stability and load-bearing capacity of the supporting structure, the individual frame-work components must be sufficiently stably connected with each other. Mostly, the frame-work components are welded together to this end. As a rule, each individual frame-work component must be stable and load-bearingly welded together with other frame-work components of the framework.

Conventionally, such welding-together of the frame-work components is mostly carried out manually. Since the framework of the passenger transport system must ultimately carry people and thus it is a safety-related component, for this purpose, usually certified welders must be employed, who then weld together the frame-work components very time consumingly. In this case, the incurring considerable amount of labor and time leads among other things to high manufacturing costs.

Also, during the manual welding of frame-work components to frame-works, usually extending over several meters, a certain distortion of the framework, that is a certain deviation of the actually welded framework from a desired geometry, is often unavoidable. When manually welding-together the frame-work components, usually a welder must work through from one end of the frame-work to be manufactured to the opposite end. In such a continued building-up process, there is generally an irregular heat input during welding, which ultimately brings the warping of the welded frame-work with it. Such a warped frame-work must be addressed first before its installation in a building. This results in additional expense and thus increased costs.

Further, passenger transport systems can be produced in various forms and, for example, extend over various lengths of distances within a building. Consequently, not all frame-works to be produced to this end are exactly the same, but can be different from each other, for example, in particular with regard to an angle of inclination and/or length of the middle part. Also, the length of the upper part and/or the lower part may vary from job to job. During the manufacturing and, in particular, the welding of the frame-works for passenger transport systems, such a plurality of variety to be produced leads to the fact that there are high demands for the welders performing logistics, and, in particular, the welding of the frame-work components.

In EP 1 795 487 B1, EP 1 795 488 B1 and EP 1 795 489 B1, a process for factory pre-assembly of a driving system and an assembly system for manufacturing a driving system as well as a driving system sensor, used for this purpose, and a lifting system are described. With the aid of the described process or the use of the driving system sensor and/or the lifting system, among other things, the pre-assembly of large and bulky driving systems should be made better planed and above all controllable. Such assembly lines require a high number of supporting structures with sufficient capacity per unit of time, wherein this high throughput can be satisfied by conventionally manufactured supporting structures only with great logistical effort and huge manufacturing workshops.

Therefore, there may be a need for a device and a process to be performed with this device for manufacturing a supporting structure for a passenger transport system, by means of which, at least some of the above-described deficiencies of conventional processes for the manufacturing of frameworks for passenger transport systems, and the device used for their performance, can be overcome. In particular, there may be a need for a device or a process to be performed with this for manufacturing a supporting structure for a passenger transport system, which allow to assemble a frame-work, forming such a supporting structure, easily, fast, reliably, cost-effectively and/or with high precision.

Such a requirement can be met with the devices according to this disclosure. Advantageous embodiments of the device are described throughout.

According to one aspect of the present invention, a device for manufacturing a supporting structure for a passenger transport system is described. The supporting structure has a frame-work having a lower part, a middle part, and an upper part, which are built from load-bearingly interconnected frame-work components, such as upper straps, lower straps, cross braces, diagonal braces and stayers.

The device has a sequential arrangement of semi- or fully automatically operating assembly stations, cooperating with each other. The sequential arrangement in this case has at least a first and a second assembly station.

The first assembly station has at least one holding device and at least one welding robot. The holding device is configured for holding frame-work components. The welding robot is configured for welding-together the frame-work components, each to the side parts of the lower part, the side parts of the middle part, and the side parts of the upper part of the framework. These are then welded together, in a second assembly station with further frame-work components, at least to a pre-positioned frame-work structure, and optionally, also to a final, load-bearing frame-work structure.

Also, the second assembly station preferably has at least one holding device and at least one welding robot. The holding device for this second assembly station is configured, on the one hand, for holding the side parts of the lower part, the side parts of the middle part, and the side parts of the upper part, and on the other hand, for holding other frame-work components, arranged adjacently each between the side parts of the lower part, the middle part, and the upper part. In most cases, two side parts are required respectively for the upper part, the middle part, and the lower part. The welding robot is configured for pre-positioned frame-work structure, on the one hand, for positionally welding-together the other frame-work components with the respectively adjacently arranged side parts of the lower part, the middle part, or the upper part, respectively to a pre-positioned lower part, a pre-positioned middle part, or a pre-positioned upper part, and on the other hand, for positionally welding-together the pre-positioned lower part and the pre-positioned upper part respectively to the opposite ends of the pre-positioned middle part. The pre-positioned frame-work structure or tag-structure essentially contains all frame-work components and therefore already has the final shape.

But, the welding robot of the second assembly station may be additionally configured so as to subsequently load-bearingly weld the first pre-positioned frame-work structure. A precedingly positioned welding-together (also known as stapling) has the advantage that the individual components hold each other in shape during load-bearing welding-together (producing the load-bearing welding-seams), and the warping of the components due to a high heat input during the manufacturing of the load-bearing welding-seams is prevented.

In order to increase the throughput of the second assembly step, for manufacturing a supporting structure, the device preferably comprises a third assembly station, which in turn has a holding device and at least one welding robot. The holding device for this third assembly station is configured for holding the pre-positioned frame-work structure. The welding robot of this third assembly station is configured for load-bearingly welding-together the frame-work components of the entire pre-positioned frame-work structure to the load-bearing framework.

Briefly summarized, the possible features and advantages of the embodiments of the invention can be considered, inter alia, and without limiting the invention, as based on the ideas and findings described below:

As above-described, it was recognized that a manual welding of frame-work components to frame-works, as it was carried out conventionally for the manufacturing of supporting structures for passenger transport systems, can bring various problems and shortcomings with it. It is therefore desirable that the manufacturing of supporting structures for passenger transport systems, at least partially, preferably even entirely, be automated. In a semi-automation, the manufacturing is mainly done by machines and is only supported by staff. In a full-automation, the manufacturing is completely done autonomously by machines.

When trying to implement an automated manufacturing of frame-work supporting structures for passenger transport systems, it has been found that the equipment and machinery used to this end must be specifically configured or selected, in order to automatically assemble the relatively large and heavy frame-works from a variety of frame-work components, and thereby to be able to load-bearingly connect the frame-work components with each other. In particular, the equipment and machinery should be suitably configured or selected in order to be able to perform an entire manufacturing of the frame-work-supporting structure as efficiently as possible within a short period of time and preferably at a low cost.

To this end, it has been recognized that the entire device should be assembled at as many as possible separate assembly stations for manufacturing the frame-work supporting structure. Every single assembly station should thereby be able to operate at least semi-automatically, preferably fully automatically, and to be able to perform certain manufacturing steps. The assembly stations should cooperate with each other in a sequential arrangement, that is, each assembly station may perform a part of an entire manufacturing sequence and thereby produce intermediate products, which are then further processed in a subsequent assembly station of a sequential arrangement in the context of another part of the manufacturing sequence, until eventually a complete frame-work supporting structure is completed at a final assembly station.

It seems advantageous in this case to equip the entire device with at least two, and in some embodiments, preferably three, assembly stations. Thereby, each of the assembly stations comprises at least one holding device and a welding robot, wherein the holding devices and welding robots of the individual assembly stations can and, in some embodiments, even should, be designed differently, and it should accomplish different tasks. The assembly stations are preferably arranged spatially close to each other in order to keep the transport paths between the assembly stations as short as possible. But also, the assembly stations can be accommodated in separate rooms or even in several buildings.

By a suitable configuration of each assembly station including their holding devices and welding robots, as well as by a suitable coordination of the individual assembly stations to each other, these can advantageously co-operate with each other in a sequence. Overall, an advantageously and particularly efficiently operating entire manufacturing device can be created.

The possible details and embodiments of different assembly stations are further explained below in the context of the description of preferred embodiments of the invention.

In addition, it will be noted that the applicant of the present patent application has filed, on the same day, another patent application entitled "Process for the robot-assisted manufacturing of a supporting structure for a passenger transport system", the other possible details and embodiments of assembly steps, preferably, to be performed through the various assembly stations can be removed.

Then, it is to be pointed out that some of the possible features and advantages of the invention herein are described with reference to various embodiments, partly based on the device and partly based on, preferably, a process performable with the device, for manufacturing a supporting structure for a passenger transport system. A person skilled in the art will recognize that the features can be, in a suitable way, combined, transmitted, adjusted and/or exchanged in order to achieve further embodiments of the invention.

BRIEF DESCRIPTION OF THE DRAWINGS

In the following, the embodiments of the invention will be described with reference to the accompanying drawings, wherein neither the drawings nor the description are to be construed as limiting the invention.

FIG. 7 illustrates a plan view of the components of the second assembly station of a device during the first joining part step, according to the invention.

FIG. 8 illustrates a side view of the components shown in FIG. 7.

FIG. 9 illustrates a plan view of the components of the second assembly station of FIG. 7 during the second joining part step.

FIG. 10 illustrates a side view of the components shown in FIG. 9.

FIG. 12 illustrates a plan view of the third assembly station of a device according to the invention.

FIG. 13 illustrates a side view of the third assembly station shown in FIG. 12.

FIG. 14 illustrates a perspective view of the third assembly station shown in FIG. 12.

The figures are only schematic and not to scale. The same reference numerals denote the same or equivalent features in the various figures.

DETAILED DESCRIPTION

Figure 1:
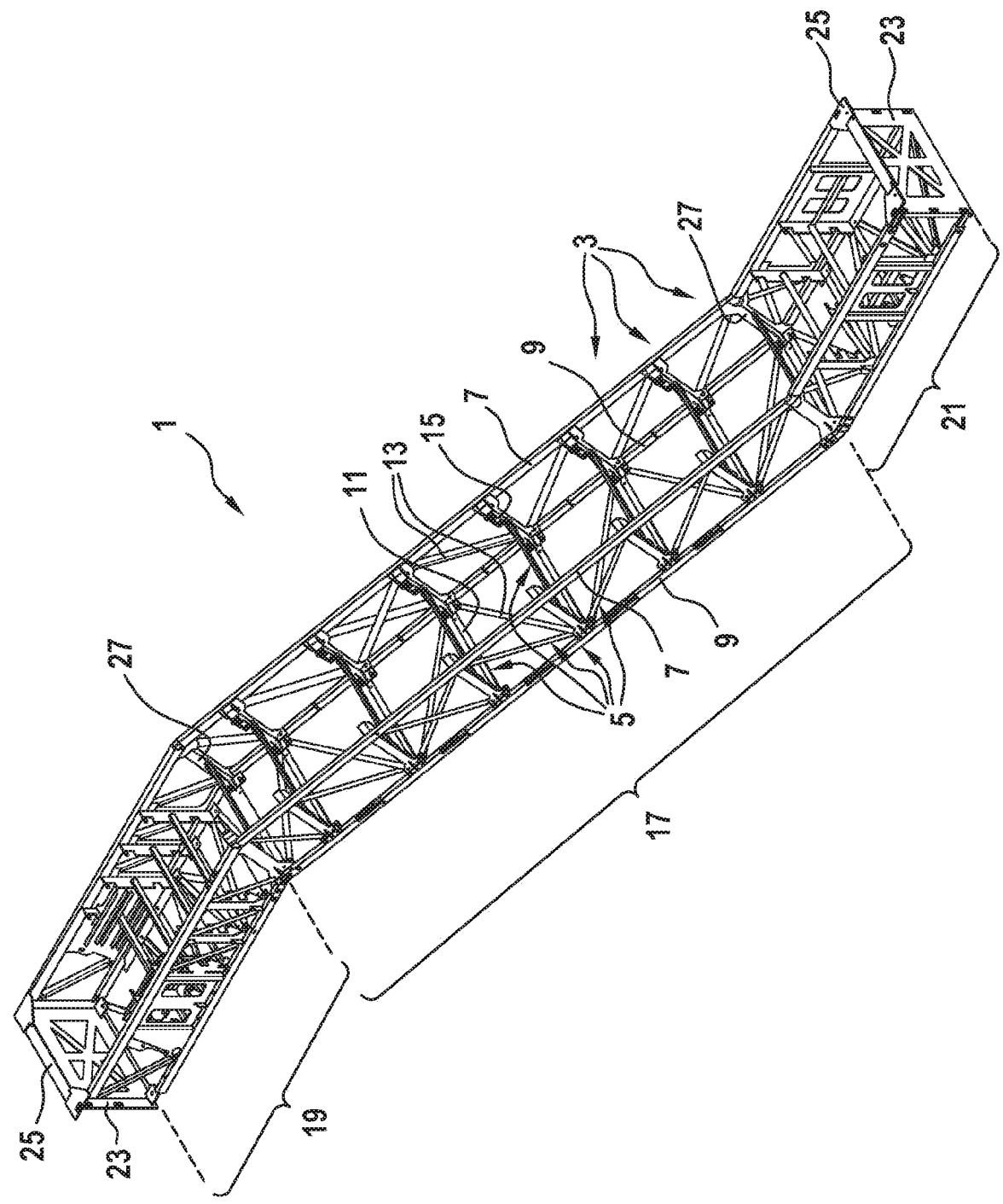
FIG. 1 shows an exemplary supporting structure for a passenger transport system, as it can be manufactured with a device according to the invention.

FIG. 1 shows an exemplary supporting structure 1 for a passenger transport system. In the illustrated example, the supporting structure 1 is configured as a frame-work 3, which can form a load-bearing structure for an escalator, by means of which persons can be transported, for example, between two floors of a building.

The framework 3 of the supporting structure 1 comprises a plurality of interconnected frame-work components 5. In this case, some of the frame-work components 5 form upper straps 7 and lower straps 9, extending mutually parallel and stretching parallel to the stretching direction of the elongated supporting structure 1. Other frame-work components 5 form cross braces 11, diagonal braces 13 and stayers 15, extending transversely to the upper- and lower straps 7, 9 and connecting these.

At the middle part 17 of the supporting structure 1, which inclinedly extends in a state built into a building, a horizontally extending upper part 19, built like a frame-work, is connected at its upper end, which can carry an upper landing position of the escalator and in which, for example, a rail block and/or a drive space can be accommodated. To the lower end of the middle part 17, another frame-work-like built lower part 21 is connected, in which, for example, another rail block and/or a tensioning station can be accommodated.

At the upper part 19 and the lower part 21, for example, the supporting structure 1 can be connected via support brackets 25 to supporting structures of a building in the region of a frame-work ends 23 and be mounted there. At the upper and lower transitions between the middle part 17 and the upper part 19 or the lower part 21, so-called angle stayers 27 are provided in the frame-work 3, which connect the upper straps 7 and lower straps 9 at a local buckling of the framework 3 to each other.

To produce a frame-work 3, serving as a supporting structure 1, conventionally a plurality of frame-work components 5 are manually welded to each other, mostly by persons who are qualified and certified as a welder, manually using welding equipment. The frame-work components 5 are thereby held in a desired position relative to each other in the meantime, mostly by means of gauges, and then welded together. As already broadly stated above, such a largely manually performed manufacturing can bring various technical as well as economic disadvantages such as high labor- and time effort, high costs for the certified welders to be employed for necessary quality assurance, mostly subsequently necessary straightening of the framework due to an irregular heat input during the welding process, and thereby the warping of the welded frame-work, a high logistical effort, etc.

Therefore, a device or preferably a process performable using this device for manufacturing a supporting structure for a passenger transport system are described herein, in which for the manufacturing of the supporting structure to be manufactured ultimately, the essential manufacturing steps can be performed semi-automatically or preferably fully automatically by using suitably formed holding devices and welding robots in coordinated multiple assembly stations.

Hereinafter, first with reference to FIG. 2, an assembly line according to the invention and an overview of the devices used therein are described for the manufacturing of supporting structures for passenger transport systems. Subsequently, with reference to FIGS. 3 to 14, the details of the equipment and machinery used in various assembly stations of the manufacturing devices as well as the respective process and assembly steps to be carried out will be described.

Figure 2:
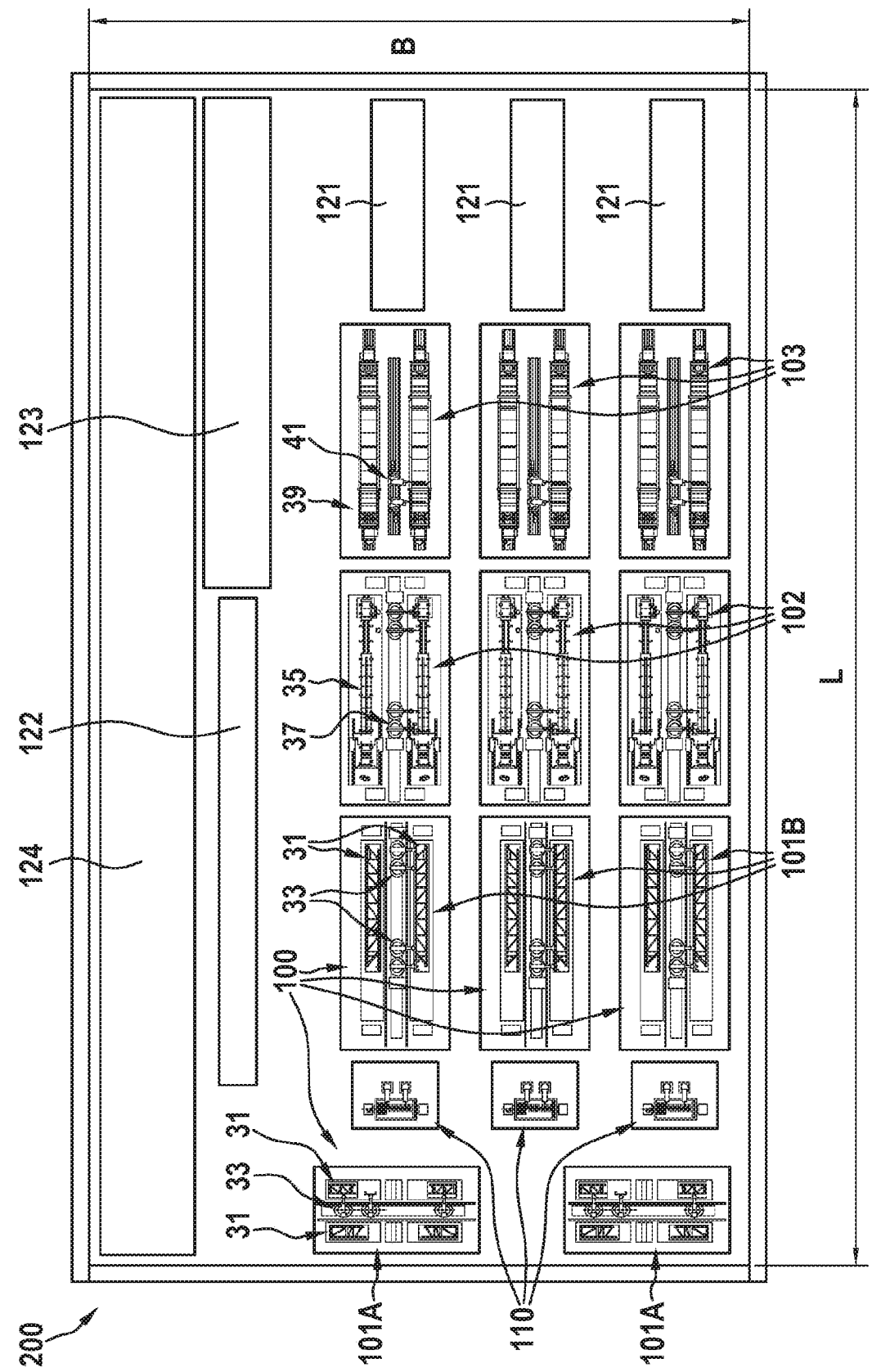
FIG. 2 illustrates an assembly line for manufacturing supporting structures for passenger transport systems according to an embodiment of the present invention.

FIG. 2 schematically outlines an assembly line according to the invention, by means of which a large number of supporting structures for passenger transport systems can be manufactured, semi- or fully automatically on an industrial scale. The assembly line 200 comprises several devices 100 according to the invention for the manufacturing of supporting structures 1 for passenger transport systems (hereinafter referred to as "manufacturing device 100"). Each manufacturing device 100 comprises a first assembly station 101, a second assembly station 102, and a third assembly station 103. These three assembly stations 101, 102, 103 are spatially sequentially arranged behind each other. Thereby, assembly steps to be performed by the individual assembly stations 101, 102, 103 are carried out in a temporal sequence one after another, and thereby the produced intermediate products are passed in each case from one of the assembly stations 101, 102, 103 to a subsequent one.

Each manufacturing device 100 further comprises a pre-assembly station 110 upstream of the first assembly station 101.

Further, the third assembly station 103, downstream of other stations and/or supplementary stations, can be provided as needed, which can be used as needed before, during or after the assembly steps to be performed by the three assembly stations 101, 102, 103. For example, a painting station 121 can be connected to the third assembly station 103 in each case. Further, a sandblasting station 122, a station 123 for cutting, sawing and welding preparation as well as a storage region 124, in which, for example, raw components and accessory components to be mounted thereon or also finished supporting structures may be stored, may be provided.

In each manufacturing devices 100, the assembly stations 101, 102, 103, provided therein, are configured so as to operate semi-automatically or fully automatically, and to cooperate with each other in a favorable manner. Therein, the individual assembly stations 101, 102, 103 are suitably equipped with equipment such as, in particular, holding devices and welding robots, and optionally, also handling robots so as to be coordinated in such a way by their assembly steps to be performed, so that a part of the total manufacturing sequence to be carried out can be carried out at each of the assembly stations 101, 102, 103, and thereby the generated intermediate products are each so far processed that they can be transported to a subsequent assembly station sequentially and be further processed there.

The individual assembly stations 101, 102, 103 and the assembly steps to be performed there are preferably coordinated with one another in such a way that the durations or clock rates, within which the individual assembly steps are carried out, are approximately the same length as far as possible in the various assembly stations. Thereby, the intermediate products can be processed with a predefinable cycle time in the individual assembly stations 101, 102, 103, and then be passed to a subsequent assembly station or another station within the manufacturing line 200.

The manufacturing device 100 has, in its first assembly station 101, at least one holding device 31 as well as at least one welding robot 33. The holding device serves to hold frame-work components during the first assembly step.

Here, the terms "holding device" and "hold" should be interpreted broadly. "Hold" may mean, for example, that frame-work components are supported or clamped, and preferably in an absolute position or in a relative position, for example, are fixed to a relative position with respect to other frame-work components, and/or also optionally previously brought into this position. A holding device may be, for example, a simple stationary holding structure, such as a table, which merely holds a frame-work component passively, that is, for example, supported against gravity. Alternatively, the holding device may also be configured so as to be able to hold frame-work components as well as to be able to actively move them. For example, a holding device can be configured in the form of a handling robot or a self-movable machine. Optionally, the holding device may also consist of several sub-devices.

At least one of the welding robots of the first assembly station serves this purpose, and is specially configured, during the first assembly step, so as to weld together frame-work components each to the side parts of the lower part 21, the side parts of the upper part 19, and the side parts of the middle part 17 of the frame-work 3.

In the present exemplary embodiment, in the assembly stations 101, 102, 103, in each case, two side parts of the lower part 21, two side parts of the upper part 19, and two side parts of the middle part 17 are manufactured. For the frameworks 3 of double escalators, the side parts similar to the middle parts would be necessary even more, which would then be installed in the second assembly station on the central longitudinal plane of the pre-positioned frame-work. The assembly stations 101, 102, 103 may be designed accordingly in order to produce and to install these central parts. Of course, the side parts, in particular, the side parts of the middle part 17 may also be divided into several sections, connectable by a screw. As a result, a passenger transport system can be created in a modular design, of which the modules can be better integrated into an existing building than the passenger transportation system in one piece.

The second assembly station 102 of the manufacturing device 100 also has at least one holding device 35 and at least one welding robot 37. However, at least one of the holding devices 35 as well as at least one of the welding robots 37 of the second assembly station 102 are configured differently from the same named equipment of the first assembly station.

In particular, the holding device 35 of the second assembly station 102 is specially configured so as to hold, within a second assembly step, the side parts of the lower part 21, the middle part 17, and the upper part 19, previously manufactured in the first assembly station 102, and in addition, to hold more frame-work components, each adjacently arranged between these side parts. The side parts typically consist of upper straps 7, lower straps 9, diagonal braces 13, and stayers 15, and essentially form two-dimensional constructs. The holding device 35 of the second assembly station 102 holds these side parts, preferably standing, that is vertically oriented. Further, between two adjacently held side parts, the holding device holds other frame-work components such as diagonal braces and cross braces, which are preferably kept lying and arranged in such a way that they are adjacent to the frame-work components of the side parts and virtually connect them to each other.

At least one of the welding robots 37 of the second assembly station 102 is then configured so as to positionally weld together the other frame-work components with the respectively adjacently arranged side parts of the lower part 21, the middle part 17, and the upper part 19, respectively to a pre-positioned lower part 21, a pre-positioned middle part 17, and a pre-positioned upper part 19.

Under "positionally welding-together", it is to be understood that each of the frame-work components are provisionally fixed relative to each other in a certain position, without the need that the welding provided for this purpose is to be necessarily configured load-bearingly. For example, such positionally welding-together can be a spot-welding or tack-welding.

In addition, at least one of the welding robots 37 of the second assembly station 102 is configured so as to positionally weld the previously positionally welded-together, pre-positioned lower part 21 and the pre-positioned upper part 19 to the opposite ends of the pre-positioned middle part 17 respectively, and to form ultimately an entire pre-positioned frame-work structure 73 by such positionally welding-together. At this stage, the pre-positioned frame-work 73 is preferably self-supporting, but not yet load-bearingly finished-welded.

The third assembly station 103 of the manufacturing device 100 also has a holding device 39 as well as at least one welding robot 41. Also, in this case, the holding device 39 and the welding robot 41 are configured for specific tasks and purposes, and it may differ in terms of their design and operation from the same equipment of the first and second assembly stations 101, 102.

In particular, the holding device 39 of the third assembly station 103 is configured so as to hold the entire pre-positioned frame-work 73, manufactured in the second assembly step, during the third assembly step. At least one of the welding robots 41 is configured so as to connect, during the third assembly step, the frame-work components of the entire pre-positioned frame-work structure 73, previously positionally welded-together, to a final load-bearing frame-work through the load-bearingly welded-together frame-work components.

Under "load-bearingly welded together", in this case, it is to be understood that the frame-work components connected to each other by means of preferably continuous, load-bearing welding-seams are welded together with each other. The load-bearing welding-seams are thus able to transmit the forces acting on the frame-work components according to their mathematical design.

Hereinafter, the various assembly steps and the possible details of the assembly stations 101, 102, 103 of a manufacturing device 100 to be used herein for this purpose are described with reference to FIGS. 3 to 14, as they are proposed in the context of a process for manufacturing a supporting structure of a passenger transport system.

It is thereby generally pointed out that the embodiments illustrated in the figures and description explained in the following should be merely exemplary, and both the manufacturing process as well as the manufacturing device 100 used here can be equipped also in another way in the context of the definitions specified by patent claims. In particular, the number and/or specific embodiments of holding devices and/or welding robots and/or other equipment in the various assembly stations 101, 102, 103 as well as in the pre-assembly station 110 described and illustrated herein can be different.

a) Pre-Assembly Step at the Pre-Assembly Station 110

Figure 3:
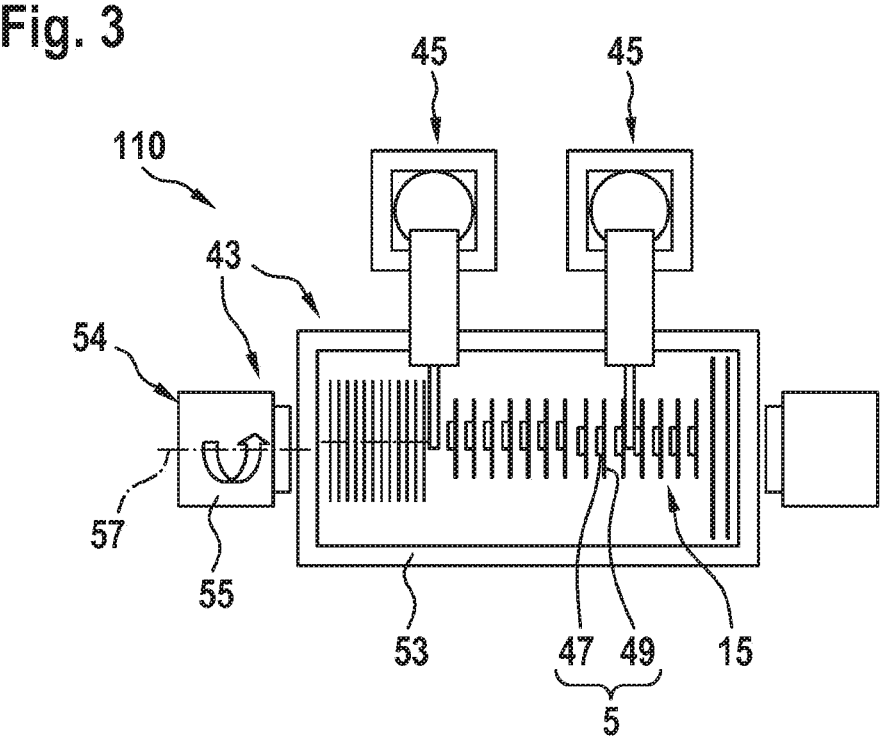
FIG. 3 illustrates a plan view of a pre-assembly station for a device according to the invention.
Figure 4:
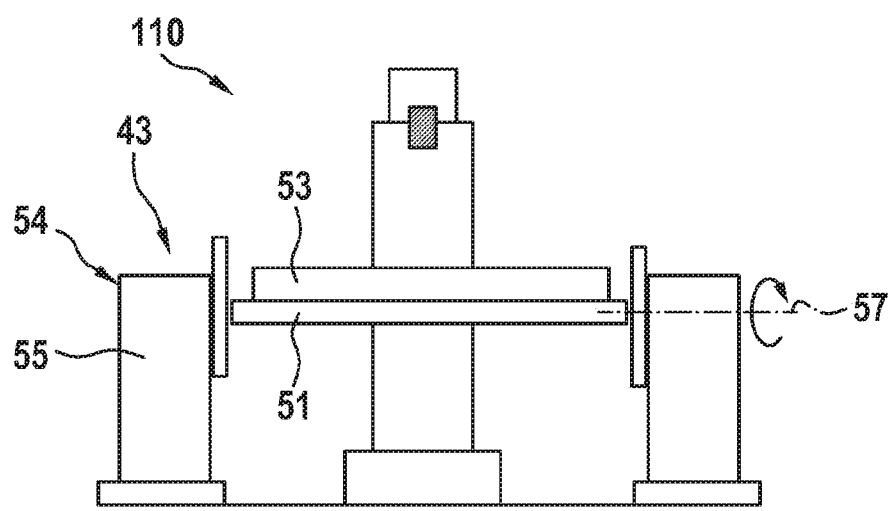
FIG. 4 illustrates a side view of a pre-assembly station shown in FIG. 3.

In FIGS. 3 and 4, a plan view and a side view of the front are shown for a pre-assembly station 110. The pre-assembly station 110 has at least one holding device 43 as well as at least one welding robot 45. The holding device 43 serves, in the context of a pre-assembly step, to hold raw components 47 and accessory components to be mounted thereon 49. At least one of the welding robots 45 then serves to weld together the raw components 47 and the accessory components to be mounted thereon 49 to the frame-work components 5.

During the pre-assembly step, the raw components 47 and the accessory components to be mounted thereon 49 can be rotated using the suitably configured holding device 43 of the pre-assembly station 110 together about a rotation axis 57. Thereby, the raw components 47 and the accessory components 49 can be brought into a suitable orientation, so that the welding robot 45 may weld these together suitably.

In the shown example, the pre-assembly station 110 may be configured so as to assemble by welding-together, for example, a metal profile serving as raw components 47 and gusset plates serving as accessory components 49 to be mounted thereon, to stayers 15. The stayer 15 can then be subsequently provided and further processed in the following assembly steps as a framework component 5.

In the illustrated embodiment, the holding device 43 of the pre-assembly station 110 is formed as a turning device 54 with a mounting frame 51 for exchangeable device cassette 53. The turning device 54 has a motor-driven inverter 55, by means of which the mounting frame 51 can be rotated around the horizontal rotation axis 57. To the mounting frame 51, the device cassette 53 can, for example, be fastened by means of a quick-release system. With the aid of the inverter 55, thus the device cassette 53 may be preferably pivoted around the rotation axis 57 by up to 360°.

In the device cassette 53, the parts to be welded, which are, in particular, the raw components 47 and/or the accessory components 49, can be installed and/or held. In this case, these parts may be properly positioned relative to each other by the device cassette 53. The raw components 47 and the accessory components to be mounted thereon 49 can then be welded with each other by using the welding robot 4. Depending on the later intended use, in this case, only provisionally positioned welding, for example, tack-welding, or load-bearing welding, can be produced for example, by continuous welding-seams.

Within an assembly line 200, optionally various pre-assembly stations 110 can be provided, by means of which various types of frame-work components 5 from the associated raw components 47 and accessory components 49 can be assembled and welded. For example, pre-assemblies can be prepared in the form of stayers, diagonal braces, cross braces, etc., each with accessory components 49 suitably mounted thereon, and provided as framework components 5 in subsequent assembly steps. The device cassette 53 to be inserted may differ from one another, depending on the raw components 47 and the accessory components to be processed 49. The welding robot(s) 45 to be employed for welding may each be adjustedly adapted to a concrete sub-assembly, and/or programmed. Depending on the control concept, the operating programs of the welding robot 45 can be centrally managed or locally managed. A local management requires that the welding robot 45 can identify the temporarily arranged device cassette 53 on the mounting frame 51, and retrieve and execute the associated operating program. For example, the welding robot 45 may be configured so as to automatically move and to operate a welding head. The welding robot 45 can move the welding head, for example, linear (i.e., one-dimensional), within a plane (i.e., two-dimensional), or preferably even arbitrarily in space (i.e., three-dimensional).

b) The First Assembly Step at the First Assembly Station 101

Figure 5:
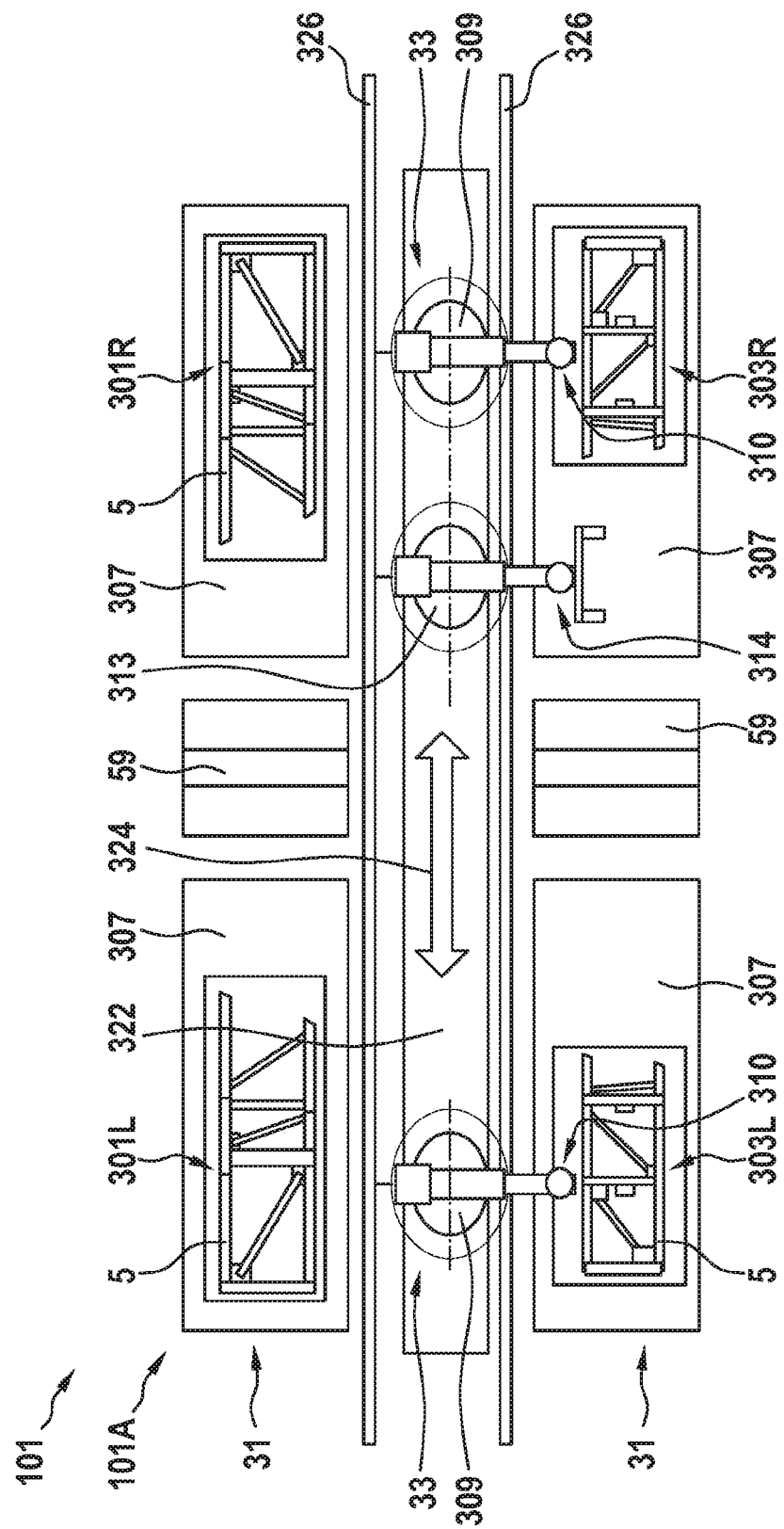
FIG. 5 illustrates a plan view of components of the first assembly station of a device according to the invention.
Figure 6:
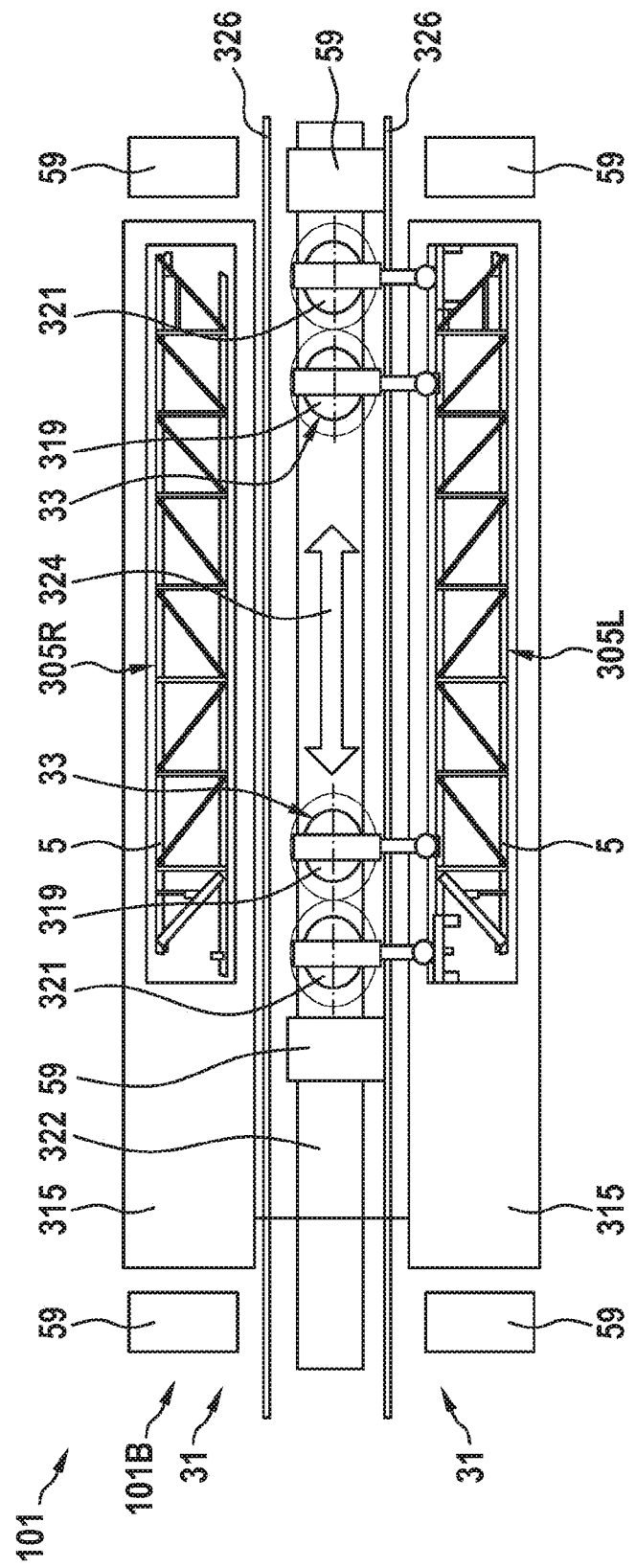
FIG. 6 illustrates a plan view of further components of the first assembly station of the device according to the invention.
Figure 11:
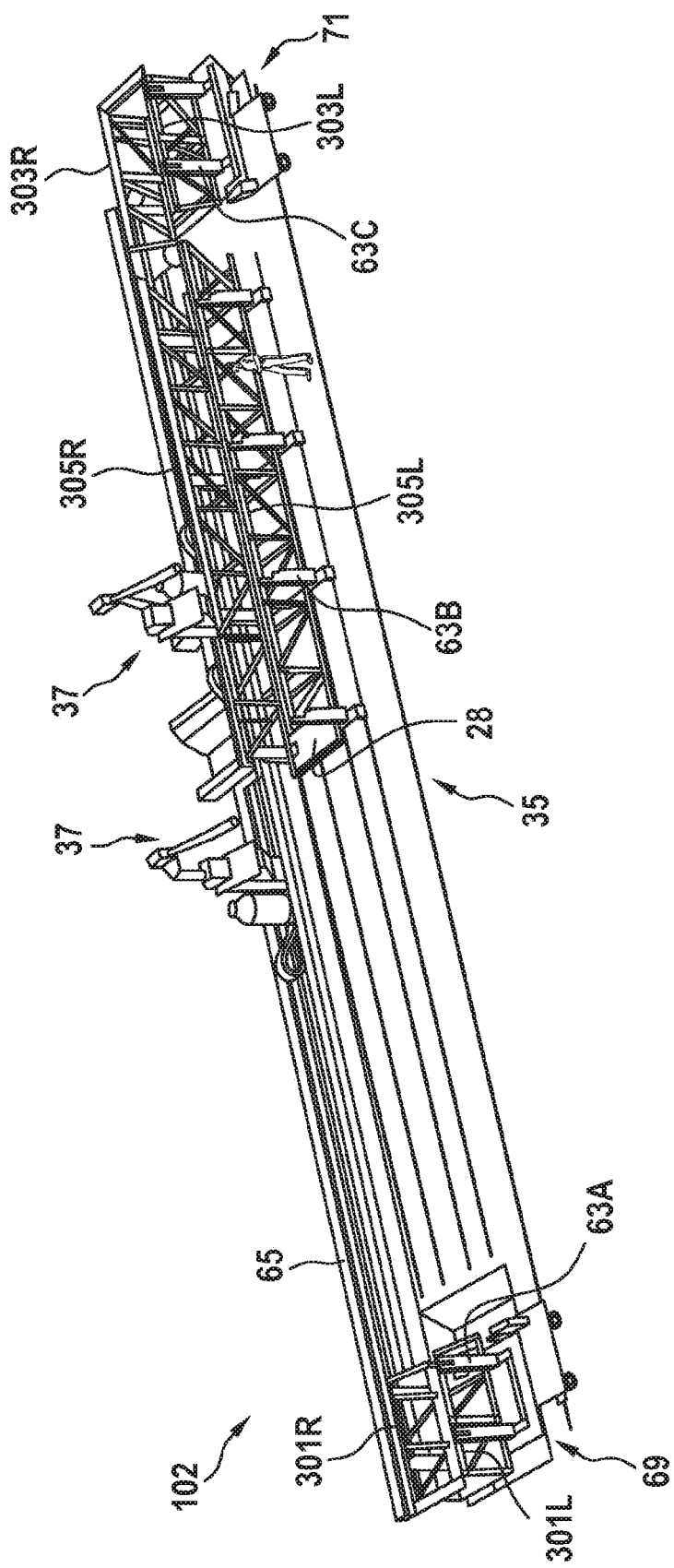
FIG. 11 illustrates a perspective view of the second assembly station of a device according to the invention.

In FIGS. 5 and 6, plan views of part regions 101*a*, 101*b* of the first assembly station 101 are shown as examples for the inventive manufacturing device 100. The part region 101*a* of the first assembly station 101 is configured so as to optionally weld together suitably prepared frame-work components 5 to the left and right side parts 301L, 301R of the upper part 19 of the frame-work 3 as well as to the left and right side parts 303L, 303R of the lower part 21 of the frame-work 3. The other part 101*b* of the first assembly station 101 is provided so as to assemble the left and right side parts 305L, 305R of the middle part 17 of the frame-work 3 from the provided frame-work components 5.

In the illustrated first assembly station 101 as an example, the holding device 31 and welding robot 33 provided there are differently configured and arranged in the different sub-regions 101*a*, 101*b*.

For the provided partial region 101*a* of the first assembly station 101 for manufacturing the side parts 301L, 301R, 303L, 303R of the upper and lower parts 19, 21, two holding devices 31 are provided in the form of two rigid tables 307. Two rigid tables 307 can hold the frame-work components 5 provided for building the side parts 301L, 301R of the upper 19. In this case, the frame-work components 5 can be suitably positioned relative to each other on one of the tables 307. Two other tables 307 can hold the frame-work components 5 to be joined together for building the side parts 303L, 303R of the lower part 21. Between two longitudinally adjacent tables 307, a part magazine 59 may be provided respectively, in which the frame-work components 5 to be provided for the formation of the upper part 19 or the lower part 21 may be accommodated. The tables 307 serve as the first holding devices.

To each of these, the first holding device 307 is associated with a welding robot 309. The welding robots 309 are configured so as to weld together the frame-work components 5 of the upper part 19 or the lower part 21 to the two side parts 301L, 301R or 303L, 303R of the upper part 19 or the lower part 21, respectively. For this purpose, the welding robot 309 can move their welding head 310 possibly at least in two dimensions, preferably in three dimensions.

Further, a handling robot 313 is associated with each first holding device 307. In this case, optionally, an individual handling robot 313 can serve both first holding devices 307. However, several handling robots 313 can be provided. A handling robot 313 can be configured so as to manage the respective frame-work components 5 of the upper 19 or the lower part 21 actively moving. For this purpose, the handling robot 313 may have, for example, a gripping arm 314 or the like. For example, the handling robot 313 can remove frame-work components 5 from the part magazine 59 and place it on one of the first holding devices 307 and position it suitably there, optionally.

In the second region 101*b* of the first assembly station 101, a second holding device 315 can be provided, for example, in the form of two rigid tables. On this second holding device 315, frame-work components 5 can be held or stored for the side parts 305R, 305L of the middle part 17. Further, two welding robots 319 associated with the second holding device 315 are configured so as to weld together the frame-work components 5 of the middle part 17 to the two side parts 305R, 305L. In addition, two handling robots 321 associated with the second holding device 315 are provided and configured so as to manage the respective frame-work components 5 of the middle part 17 actively moving.

The welding robots 309, 319 and/or the handling robots 313, 321 may be configured so as to translationally shift its position in a direction parallel to the longitudinal extension direction of the lower part 21, upper part 19, and middle part 17, mounted on an associated holding device 305, 307, 315. The shift direction 324 is indicated by arrows in FIGS. 5, 6. For example, the robots 309, 313, 319, 321 can be moved along a travel path 322 or along rails. As protective measures, movable partition-walls 326 may be provided, which, for example, can extend parallel to the shift direction. Optionally, the part magazine 59 may be coupled to one of the movable robots 309, 313, 319, 321 and can be shifted together with it.

During the first assembly step, the first assembly station 101 can be used in order to manage and position the respective frame-work components 5 of the lower part 21 or the upper part 19 at one of the two first holding device 307 respectively by means of one of these handling robots 313 associated with the first holding device 307. The respective frame-work components 5 of the lower part 21 or the upper part 19 can then be held by one of the first holding devices 307 respectively and are welded together there by means of an associated welding robot 309 to the side parts 301L, 301R of the upper part 19 or the side parts 303L, 303R of the lower part 21. Similarly, in the other part region 101*b* of the first assembly station 101, during the first assembly step, the respective frame-work components 5 of the middle part 17 can be actively managed and positioned by means of the handling robot 321 associated with one of the two holding devices 315, before they are then welded together there by means of the respectively associated welding robots 319 to two side parts 305R, 305L of the middle part 17.

In other words and specifically related to the exemplary embodiments shown in FIGS. 5 and 6, three workstations are provided in the first assembly station, in order to be able to produce each of the left and right side parts 301, 303, 305 for the upper part 19, the lower part 21 and the middle part 17 of the frame-work 3. Each of these three workstations has two rigid device tables, each one for a left side part and a right side part. Between these device tables serving as holding devices 307, a handling robot 313 and a welding robot 309 are arranged respectively for the side parts 301, 303 of the upper part 19 and lower part 21. For the side parts 305 of the middle part 17, two handling robots 321 and two welding robots 319 are preferably provided.

During the first assembly step, one of the handling robots 313, 321 sets the frame-work components 5 necessary for one of the side parts 301, 303, 305, in the form of sub-assemblies and components in a proper position on one of the device tables. An associated welding robot 309, 319 then welds all parts of each side part 301, 303, 305 together. The handling robot 313, 321 removes the sub-assemblies, components or frame-work components 5, for example, one or more from part magazines 59. Optionally, the handling robot 313, 321 can be configured so that it can lift and remove the finished welded side parts 301, 303, 305 from a device table.

c) The Second Assembly Step at the Second Assembly Station 102

After frame-work components 5 have been welded together respectively to the left and right side parts 301, 303, 305 of the upper part 19, the lower part 21, and the middle part 17 in the first assembly step, the side parts 301, 303, 305 are then brought from the first assembly station 101 to the second assembly station 102. To this end, for example, in an assembly line 200, for this purpose, for example, lift cranes, special vehicles or the like can be provided. In this case, the side parts 301, 303, 305 are kept by slipways 63A, 63B, 63C as shown in FIG. 7 and FIG. 8.

In the second assembly station 102, as the first part assembly step of the second assembly step carried out there, first, the respective side parts 301, 303, 305 are welded by welding other frame-work components 5 such as cross braces 61B, connecting each a left and a right side part, to a pre-positioned upper part 19, a pre-positioned lower part 21, and a pre-positioned middle part 17. However, in this state, the frame-work components 5 are not yet load bearing, but only positionally welded together, for example by spot- or tack-welding.

Subsequently, in the second assembly station 102, as a second part assembly step, the entire pre-positioned framework structure 73 is welded together. For this purpose, the pre-positionally welded together pre-positioned upper part 19 and the pre-positionally welded together pre-positioned lower part 21 are moved up respectively to the also pre-positionally welded together middle part 17, pivoted relative to this in a desired angle and then positionally welded to this, that is fixed mostly only with spot- or tack-welding at the middle part 17.

In FIGS. 7 to 11, the second assembly station 102 is respectively shown in a plan view and in a side view as well as in a perspective view during both part assembly steps of the second assembly step.

The holding device 35 of the second assembly station 102 has a first, a second and a third part holding device 35A, 35B, 35C. The first part holding device 35A is built for holding the left and the right side parts 301L, 301R of the upper part 19 and for holding further frame-work components 61A, adjacently arranged between the two oppositely arranged side parts 301R, 301L of the upper part 19. Similarly, the second part holding device 35B is formed for holding the two side parts 305L, 305R of the middle part 17 and for holding further frame-work components 61B, each adjacently arranged between the side parts 305L, 305R of the middle part 17. The third part holding device 35C is accordingly formed for holding the two side parts 303L, 303R of the lower part 21 and for holding further frame-work components 61C, each adjacently arranged between the side parts 303L, 303R of the lower part 21. The first and the third part holding device 35A, 35C are each formed movable relative to the second part holding device 35B.

The part holding devices 35A, 35B, 35C are each configured so as to hold the respective left and right side parts 301L, 301R, 303L, 303R, 305L, 305R in a standing, i.e. vertical position. For this purpose, the holding device 35 of the second assembly station 102 has respective slipways 63A, 63B, 63C at its three part holding devices 35A, 35B, 35C. The slipways 63B for the middle part 17 are preferably fixedly mounted, whereas the slipways 63A, 63C for the upper part 19 and the lower part 21 can be moved horizontally in each case together with the first or the third part holding device 35A, 35C, relative to the slipways 63B of the second part holding device 35B.

The second assembly step of the manufacturing process to be performed using the second assembly station 102 is then divided into two part assembly steps.

During the first part assembly step, as is illustrated in FIGS. 7 and 8, the respective side parts 301, 303, 305 of the upper, middle and lower parts 19, 17, 21 as well as the other frame-work components 61A, 61B, 61C, are respectively arranged adjacent to each other, for example, by means of the handling robots 38, and held in appropriate orientations.

In this position, they can then be at least positionally provisionally welded with each other using one of the welding robots 37, and thereby the pre-positioned upper part 19, the pre-positioned middle part 17, and the pre-positioned lower part 21 are built.

More specifically, the two side parts 301R, 301L of the upper part 19 as well as the other frame-work components 61A, adjacently arranged each between the side parts 301L, 301R of the upper part 19, are held in the first part holding device 35A. The two side parts 305L, 305R of the middle part 17 as well as other frame-work components 61B, adjacently arranged each between the side parts 305L, 305R of the middle part 17, are held in the second part-holding device 35B. The two side parts 303L, 303R of the lower part 21 and the other frame-work components 61C, adjacently arranged each between the respective side parts 303L, 303R of the lower part 21, are held in the third part-holding device 35C.

During this first part assembly step of the second assembly step, the first and the third part holding devices 35A, 35C are still spaced apart in the longitudinal direction of the second part holding device 35B, as shown in FIGS. 7 and 8. In such a configuration, the welding robots 37 as well as any handling robot 38 of the second assembly station 102, can easily manage the respective side parts 301, 303, 305, as well as further frame-work components 61A, 61B, 61C arranged therebetween, and positionally weld together.

The pre-positionally welded-together pre-positioned upper, middle and lower parts 19, 17, 21, produced in this way in the first part step, are then assembled in the second part assembly step of the second assembly step, as is illustrated in FIGS. 9 and 10, to an entire pre-positioned frame-work structure 73. For this purpose, the first and third part-holding devices 35A, 35C together with the prepositionally welded together pre-positioned upper and pre-positioned lower parts 19, 21, held thereon, are shifted relative to the second part holding device 35B and the pre-positionally welded together pre-positioned middle part 17, held thereon.

The shifting of the first and third part holding devices 35A, 35C can include, on the one hand, a lateral, usually horizontal operation, and on the other hand, a pivoting. In other words, for example, the first part holding device 35A can be laterally moved up to the second part holding device 35B, until the lateral end of the pre-positionally welded together upper part 19, held on the first part holding device 35A, abuts the opposite end of the pre-positionally welded together pre-positioned middle part 17, mounted on the second part-holding device 35B.

In addition to such a lateral movement, then the first part holding device 35A can be configured so as to pivot the pre-positioned upper part 19 relative to the pre-positioned middle part 17, in order to bring it in an orientation as it is later desired for the finished frame-work 3. In other words, the upper part 19 and the middle part 17 may initially be moved toward each other in the same plane, but then the upper part 19 is pivoted out of this plane, so that the longitudinal extension directions of the upper part 19 and the middle part 17 enclose an angle with each other. This angle corresponds substantially to the inclination angle, in which later the middle part 17 should be arranged relative to the generally horizontally arranged upper part 19 within a building.

In a corresponding manner, the lower part 21 may initially be moved up laterally to the middle part 17 and then be pivoted relative thereto.

For example, in order to be able to suitably pivot the upper part 19 relative to the middle part 17, the first part holding device 35A can be configured so as to pivot its components, holding the upper part 19, relative to the second part holding device 35B. In order to be able to achieve an angle arrangement of the upper part 19 relative to the middle part 17, desired for the ultimately produced frame-work 3, in the case where the middle part 17 is held at ground level and thus horizontally, the upper part 19 can be pivoted downward. For this purpose, a sufficiently large pit 67 may be provided on the first part holding device 35A, in which the end of the upper part 19 directed away from the middle part 17 can be shifted down. To this end, at the first part holding device 35A, a lowerable pivot mechanism 69 may be provided.

In an analogous manner, it can be provided that during the second part assembly step of the second assembly step, the previously pre-positionally welded together lower part 21 to laterally proceed towards the middle part 17 and to pivot relative to this. The third part holding device 35C may have a liftable pivoting mechanism 71 to this end, by means of which the end of the lower part 21 directed away from the middle part 17 can be lifted.

The lowerable pivoting mechanism 69 and the liftable pivoting mechanism 71 may be formed, for example, with a hydraulic system. In particular, they can be configured so as to pivot downwards or upwards the upper part 19 or the lower part 21 at an angle of typically up to 50°, usually between 20° and 40°, often an angle of about 35°.

Subsequently, a possible embodiment of the second assembly station 102 as well as the second assembly step to be carried out there, again using slightly different formulations, i.e. not necessarily with the terminology used in claims, is explained in order to illustrate the possible embodiments of the manufacturing device or the manufacturing process even further.

In the second assembly station 102, the assembled side parts 301, 303, 305, along with other components and frame-work components 5 during the first assembly step, are finally assembled to the finished frame-work 3, wherein the framework 3 at this process stage may already have its final form, but may not necessarily have its final load-bearing capacity. The assembly is carried out at least in two part assembly steps.

In the first part assembly step (FIGS. 7 and 8), the right and the left side parts 301R, 301L of the upper part 19 are connected to each other by means of welded tack-seams by inserting further frame-work components 61A, such as cross braces 11 or oil plates 28. Where, for example, for stability reasons, a simple stapling is not sufficient, it must optionally, at least partially be welded. Where possibly, the parts are only welded together, the through-welding is performed mainly in the third assembly step described below.

The allocation of tack-welding and through-welding in the second assembly station 102 or the second assembly step can be selected not only depending on the desired stability, but also depending on a required time. That is, the resting time of the frame-work in the second assembly station 102, that is a period for the second assembly step, and the corresponding resting time in the third assembly station 103 should be approximately equal, at least as long as an equal number of workstations in the second assembly station 102 and the third assembly station 103 are provided. Of course, the number of workstations in the second and the third assembly stations 102, 103 may be selected differently.

The same tacking or welding is also performed with the side parts 305R, 305L, 303R, 303L of the middle part 17 and of the lower part 21 as well as further frame-work components 61B, 61C interposed between them. The pre-positioned upper-, middle- and lower parts 19, 17, 21, produced in the context of this first part assembly step of the second assembly step, already have a typical U-shaped frame-work cross-section for the frame-work 3 of a passenger transport system.

In the second part assembly step of the second assembly step, the upper part 19, the middle part 17 and the lower part 21 are joined together by welding. For this purpose, optionally the same welding robot 37 may be used, as they have already been used during the first part assembly step.

For this purpose, the second assembly station 102 has a stationary slipway 63B for the middle part 17 as well as one movable slipway 63A for the upper part 19 and one movable slipway 63C for the lower part 21. Further, two handling robots 38 are provided in addition to the two welding robots 37. Both the welding robots 37 and the handling robots 38 may be arranged on a roadway 65 for robots, which extends parallel to the longitudinal extent of the frame-work to be manufactured 3. Through this, the robots 37, 38, can reach each part 17, 19, 21 of the frame-work 3 to be welded.

The slipways 63A, 63B, 63C serve to receive the prepared side parts 301, 303, 305, which can be, for example, inserted and fixed in the side accommodation by workers using cranes. The slipways 63A, 63B, 63C, may further have a flat support, on which, first, oil plates 28 and then the cross braces 11 are placed by one of the handling robots 38. Subsequently, these further frame-work components 28, 61A, 61B, 61C are welded together with the respective side parts 301, 303, 305 and/or at least partially welded together continuously. The handling robot 38 takes out the other frame-work components 28, 61A, 61B, 61C preferably from the part magazines 59.

The movable slipway 63A of the lower part 21 has a lifting-pivoting mechanism 71. The finished tacked/welded lower part 21 is pivoted by means of this lifting-pivoting mechanism 71 in the context of the second part assembly step, in that its end facing away from the middle part 17 is lifted. Then, the slipway 63C of the lower part 21 is moved up to the previously completed tacked/welded middle part 17 and tacked- or at least partially continuously connected thereto by welding.

The movable slipway 63 A for the upper part 19 has a lowering-pivot mechanism 69. The finished tacked/welded upper part 19 is pivoted in the context of the second part step of the second assembly step, in that its end facing away from the middle part 17 is lowered. To this end, optionally the pit 67 is provided, if the slipway 63B of the middle part 17 is configured at ground level. Subsequently, the slipway 63A of the upper part 19 is moved up to the finished tacked/welded middle part 17, and connected to this by welding, tacked or at least partially continuously. All welding operations are carried out by one of the welding robots 37.

d) The Third Assembly Step at the Third Assembly Station 103

After in the second assembly station 102, by means of the second assembly step, first, the pre-positioned upper-, middle- and lower parts 19, 21, 17 from provisionally interconnected side parts 301, 303, 305 by means of tack-welding, and additional frame-work components 28, 61A, 61B, 61C have been joined together, and then the upper-, lower- and middle parts 19, 21, 17 have been joined to the entire pre-positioned frame-work structure 73, provisionally positionally preferably by tack welding connection, initially, this, not yet load-bearingly pre-positioned frame-work structure 73 will be further processed in the third assembly step carried out in the third assembly station 103, by load-bearingly welding-together its frame-work components 5, 61 by means of continuous welding-connections, to the load-bearing framework 3 to be ultimately produced.

In FIGS. 12 to 14, as an example, a third assembly station 103 to be used for this purpose is shown in a plan view, side view or perspective view. In FIG. 13, this has been omitted for clarity reasons on the rendering of the welding robot 41.

The third assembly station 103 has a holding device 39, which is configured so as to hold the entire already pre-positioned frame-work structure 73 and optionally to move, so that its previously pre-positionally assembled frame-work components only by tack-welding using a welding robot 41, can be load-bearingly welded together.

For example, the holding device 39 of the third assembly station 103 can be configured so as to rotate the entire pre-positioned frame-work structure 73 around a longitudinal axis thereof.

For this purpose, the holding device 39 may have a turning device 75, on which a component holder 79 is mounted, which can be rotated around a rotation axis 77 using a motor 81, for example, by up to 90° or 180°, preferably up to 360°.

In order to load-bearingly weld the frame-work structure 73, pre-positionally assembled in the second assembly step, this is first fixed to the turning device 75 in the third assembly step. In this case, the frame-work structure 73, not yet load-bearingly pre-positioned, can be supported in the meantime via shelf supports 83. In addition, a scaffold 85, provisionally attached to the pre-positioned frame-work structure 73, may serve in order to support the frame-work structure 73, until it is sufficiently load-bearingly welded in the third assembly step.

Once the pre-positioned frame-work structure 73 is fixed in this manner to the turning device 75, serving as a holding device 39, it can rotate the entire pre-positioned frame-work structure 73 around the rotation axis 77.

The movable welding robot, arranged laterally next to the turning device 75 and parallel to the turning device 75 along a movable track 87, can then, after the pre-positioned frame-work structure 73 has been suitably rotated about the rotation axis 77, reach all interfaces to be welded between adjacent frame-work components 5 of the frame-work structure 73 using its welding heads 89, and connect them load-bearingly with each other, by generating continuous welding-seams.

If expressed with slightly different words, the welding-seams, mostly only tacked initially in the second assembly step, will be through-welded in the third assembly step. The third assembly station 103 provided for this purpose may have in this case shelf-supports 83 for accommodating the tacked frame-work structure 73. On both sides, turning devices 75 are arranged, of which the rotatable accommodation 79 are preferably movable in the Z-axis, i.e., that are movable in height, so that the frame-work structure 73 of the shelf-supports 83 can be lifted and then turned around the rotation axis 77. The third assembly station 103 is further equipped with preferably two welding robots 41. Optionally, a support structure 85 may be required, which is already built at the end of the previously performed second assembly step, for example, after the tack-welding, and can be used for the stabilization of tacked pre-positioned frame-work structure 73 during the transport from the second assembly station 102 to the third assembly station 103. This supporting structure 85 may optionally remain on the frame-work structure 73 in the third assembly station 103, until their welding-seams are welded through.

Subsequently, some possible further features of the embodiments of the invention will be explained. Unless otherwise specified, these features can be implemented in all three assembly stations 101, 102, 103.

In particular, in the first and the second assembly stations 101, 102, a holding device 31, 35 provided there can be configured so as to passively stationary hold respective frame-work components 5 or side parts 301, 303 305. The holding devices 31, 35 can thereby be configured, for example, as simple, stationary tables, which support the components to be held only from below. Optionally, additional clamping devices may be provided in order to be able to secure the components against a lateral slippage.

Alternatively or additionally, in particular, the holding devices 31, 35 of the first and second assembly stations 101, 102 can have at least one handling robot 313, 321, 38, which is configured so as to manage respective frame-work components 5 and side parts 301, 303, 305 actively moving. Such a handling robot 313, 321, 38 may, for example, be provided with a gripping- or holding mechanism, by means of which it can hold or grip the frame-work components 5 and side parts 301, 303, 305. This gripping- or holding mechanism may be movable relative to the base of the handling robot, for example, in that this is attached to a movable and/or pivotable arm. Depending on the application, a shift in one, two or three spatial directions and/or orientations in one, two or three space angles may be possible.

In particular, the first and/or second assembly stations 101, 102, can additionally have a part magazine 59 for storing and providing components for the frame-work components 5. A handling robot 313, 321, 38 may be configured in this case in order to remove components from the part magazine 59 and to bring targeted to a predeterminable position at the holding device 31, 35.

The welding robots 33, 37, 41 to be provided in the various assembly stations 101, 102, 103, each can be configured in the same way, but can also differ from each other depending on application-specific requirements. The welding robots 33, 37, 41 may, in particular, have a welding head 310 for performing the welding-together and be configured so as to shift the welding head 310 with at least three translational, preferably three translational and three rotational degrees of freedom of movement.

In other words, a welding robot can be configured, in particular, to be able to shift its welding head 310 translationally in three mutually orthogonal planes. Preferably, it can be additionally provided to be able to pivot the welding head 310 also rotationally about three mutually orthogonal axes. Such a welding robot can bring its welding head 310 within a working range in an arbitrary position and orientation in space. Through this, the welding robot can also perform geometrically complex welding operations. For example, welding at places difficult to access and/or geometrically complex, in particular, can produce non-linear-shaped welding-seams.

But optionally, also simply constructed welding robots can be used, which can shift a welding head, for example, only along one or two directions and/or cannot pivot the welding head or pivot only about one or two axes.

In a particular embodiment of the assembly process, already during the second assembly step, a load-bearing welding-together of the frame-work components of the entire pre-positioned frame-work structure can also be partially carried out by creating continuous welding-connections to the load-bearing frame-work by means of at least one welding robot. In other words, in the second assembly step, not only positional welding, i.e., for example, tack-welding, is made, but also, in addition, partially continuous and thus load-bearing welding-seams between frame-work components can be generated. An extent of the performed welding processes during the second and during the following third assembly steps should be, in this case, preferably coordinated with one another in such a way that the second and the third assembly steps essentially take the same length.

In other words, in the case where a complete through-welding in the third assembly step of the previously only tack-welded pre-positioned frame-work structure 73 in the second assembly step would take considerably longer than the entire second assembly step, a part of this through-welding process can be already shifted forward in the second assembly step, so that both assembly steps need about the same amount of time. A total cycle time within the assembly line 200 can be reduced in this way.

In the context of a job-specific manufacturing of supporting structures for passenger transport systems, for example, corresponding data sets from CAD systems, can be transmitted to a manufacturing control of the manufacturing device, so that, for example, the handling robots of different assembly stations can pick suitable components or frame-work components from part magazines, and can put to predetermined positions, and the welding robot can always move to correct positions.

It is also conceivable that the cutting of upper straps and lower straps for a supporting structure is carried out on an adjacent workstation of the first assembly station, so that such job-specific components are prepared immediately before their further processing in the first assembly station.

Also, it is conceivable to manufacture without any static devices, such as tables, in that one or more handling robots hold all the parts or frame-work components to be joined together until a welding robot has welded this to an already prepared compartment workpiece.

In summary, herein a device 100 as well as an assembly line 200 or a process to be carried out therewith for manufacturing a supporting structure 1 for a passenger transport, such as an escalator, are described, which have a sequential arrangement of semi- or fully automatically operating and mutually cooperating assembly stations 101, 102, 103 and a sequential order of assembly steps. Each of the assembly stations 101, 102, 103 has components and machines in the form of at least one holding device 31, 35, 39 and at least a welding robot 33, 37, 41 as well as, optionally, at least one handling robot 38, 313, 321. The assembly stations 101, 102, 103 are configured in terms of their used components and machines, in such a way that intermediate products can be produced efficiently by means of respective assembly steps and each coordinated with a subsequent assembly station, so that the intermediate products can be passed sequentially and with optimized short cycle times from assembly station to assembly station, to be able to provide a finished, load-bearing supporting structure 1 at the end of the sequence.

The herein presented manufacturing device or assembly line as well as manufacturing process performable preferably with this can bring several technical as well as economic advantages over the conventional manufacturing of supporting structures for passenger transport systems. For example, a manufacturing time can be significantly reduced, and thus a manufacturing rate per required working area can be increased with the proposed manufacturing process. Further, the quality of the welding-seams, holding together the supporting structure by the applied automation and used welding robots, is usually higher than that of conventional manual welding. Further, the proposed process or the application of the proposed manufacturing device requires less manufacturing personnel and, in particular, less highly qualified manufacturing personnel such as certified welders. Finally, the proposed manufacturing process allows a significantly reduced delay for the produced supporting structure, since in the case of the two used welding robots, a welding process has begun, for example, at both ends of the framework, and then can be continued toward the center of the frame-work and thus a heat input can be carried out symmetrically. Overall, the manufacturing of supporting structures for passenger transport systems can be carried out with high quality at lower cost.

Finally, it is to be pointed out that the terms such as "having", "comprising", etc. do not exclude other elements or steps, and the terms such as "a" or "one" do not exclude plurality. Further, it should be pointed out that features or steps, which have been described with reference to one of the above embodiments, also in combination with other features or steps of other embodiments described above, may be applied. Reference signs in the claims are not to be considered as limiting.

The invention claimed is:

1. A device for manufacturing a supporting structure for a passenger transport system, wherein the supporting structure has a frame-work with load-bearing frame-work components interconnected to a lower part, a middle part, and an upper part, respectively, the device comprising:
   a sequential arrangement of assembly stations the sequential arrangement of assembly stations comprising:
      a first assembly station, having
         at least one holding device configured to hold frame-work components and
         at least one welding robot configured to weld together the frame-work components to side parts of the lower part, side parts of the middle part, and side parts of the upper part of the framework; and
      a second assembly station configured to positionally weld together the side parts of the lower part, the side parts of the middle part and the side parts of the upper part, welded together in the first assembly station, with other frame-work components.

2. The device according to claim 1, wherein the second assembly station comprises:
   at least one holding device configured to
      hold the side parts of the lower part, the side parts of the middle part, and the side parts of the upper part, and
      hold the other frame-work components between the side parts of the lower part, the middle part, and the upper part; and
   at least one welding robot configured to
      positionally weld together the other frame-work components with the side parts of the lower part, the middle part and the upper part, respectively to a pre-positioned lower part, a pre-positioned middle part and a pre-positioned upper part, and
      positionally weld together the pre-positioned lower part and the pre-positioned upper part, respectively, at opposite ends of the pre-positioned middle part to a pre-positioned a frame-work structure.

3. The device according to claim 2, further comprising a third assembly station comprising:
   a holding device configured to hold the pre-positioned frame-work structure, and
   at least one welding robot configured to load-bearingly weld together frame-work components of the entire pre-positioned frame-work structure to the load-bearing framework.

4. The device according to claim 3, wherein the holding device of the second assembly station comprises:
- a first part holding device configured to hold the side parts of the upper part and to hold the other frame-work components between the side parts of the upper part,
- a second part holding device configured to hold the side parts of the middle part and the other frame-work components between the side parts of the middle part, and
- a third part holding device configured to hold the side parts of the lower part and to hold the other frame-work components between the side parts of the lower part,
- wherein two of the part holding devices of the three part holding devices are each movable relative to the other of the three part holding devices.

5. The device according to claim 4, wherein the first part holding device is configured to pivot the pre-positioned lower part relative to the pre-positioned middle part.

6. The device according to claim 3, wherein the holding device of the third assembly station is configured to rotate the pre-positioned frame-work structure around a longitudinal axis thereof.

7. The device according to claim 3, wherein the holding device of at least one of the first and second assembly stations is configured to keep respective frame-work components and side parts passively stationary.

8. The device according to claim 3, wherein the holding device of at least one of the first and second assembly stations comprises at least one handling robot, which is configured to actively move respective frame-work components and side parts.

9. The device according to claim 8, wherein at least one of the first and second assembly stations further comprises at least one part-magazine configured to store and provide components for the frame-work components, and wherein the handling robot is configured to remove components from the part-magazine and to bring the components to a predeterminable position on the holding device.

10. The device according to claim 3, wherein the first assembly station comprises:
- two first holding devices configured to hold each of the frame-work components of the lower part and the upper part, and
- a welding robot associated with each first holding device configured to weld together the frame-work components of the lower part and the upper part, each to the two side parts of the lower part and two side parts of the upper part of the framework;
- a handling robot associated with each first holding device, which is configured to actively move the respective frame-work components of the lower part and the upper part;
- a second holding device configured to hold the frame-work components of the middle part;
- two welding robots associated with the second holding device configured to weld together the frame-work components of the middle part to the two side parts of the middle part of the framework; and
- two handling robots associated with the second holding device, which are configured to actively move the respective frame-work components of the middle part.

11. The device according to claim 3, wherein the welding robot of at least one of the first, second and third assembly stations has a welding head for carrying out the welding-together, and is configured to shift the welding head at least with three translational movement degrees of freedom.

12. The device according to claim 3, wherein the welding robot of at least one of the first, second and third assembly stations is configured to translationally shift its own position in a direction parallel to a longitudinal extension direction of the lower part, the middle part, and the upper part.

13. The device according claim 1, further comprising a pre-assembly station comprising:
- at least one holding device for holding raw components and accessory components mounted thereon, and
- at least one welding robot for welding-together the raw components and the accessory components mounted thereon to the frame-work components.

14. The device according to claim 13, wherein the holding device of the pre-assembly station is configured to rotate the raw components and the accessory components mounted thereon together around a rotation axis.

15. An assembly line for manufacturing supporting structures for passenger transport systems with the device according to claim 4, wherein the assembly line comprises:
- first assembly stations comprising
  - two first holding devices configured to hold the frame-work components of the lower part and the upper part,
  - a welding robot associated with each first holding device configured to weld together the frame-work components of the lower part and the upper part respectively to the two side parts of the lower part and the two side parts of the upper part of the framework,
  - a handling robot associated with each first holding device, which is configured to actively move the respective frame-work components of the lower part and the upper part,
  - three second holding devices configured to hold the frame-work components of the middle part, and
  - two welding robots associated with each second holding device configured to weld together the frame-work components of the middle part to the two side parts of the middle part of the framework, and
  - two handling robots associated with each second holding device, which are configured to actively move the respective frame-work components of the middle part; and
- second assembly stations comprising
  - three holding devices configured to hold
    - each of the two side parts of the lower part, the two side parts of the middle part, and the two side parts of the upper part, and
    - other frame-work components, each adjacently arranged between the side parts of the lower part, the middle part, and the upper part,
  - two welding robots associated with each holding device configured to positionally weld together
    - the other frame-work components with the respective adjacently arranged side parts of the lower part, the middle part, and the upper part, each to a pre-positioned lower part, a pre-position middle part, and a pre-positioned upper part, and
    - the pre-positioned lower part and the pre-positioned upper part at the respective opposite ends of the pre-positioned middle part to an entire pre-positioned frame-work structure,
  - two handling robots associated with each holding device, which are configured to actively move respective further frame-work components (61A, 61B, 61C) actively moving; and third assembly stations with comprising
three holding devices each for holding one of the entire pre-positioned frame-work structures, and
two welding robots associated with each holding device for load-bearingly welding-together the frame-work components of each entire pre-positioned frame-work structure to the load-bearing framework.

16. The device according to claim 4, wherein the third part holding device is configured to pivot the pre-positioned upper part relative to the pre-positioned middle part.

17. The device according to claim 11, wherein the welding head is configured to move in at least with three rotational degrees of freedom.

* * * * *

UNITED STATES PATENT AND TRADEMARK OFFICE
CERTIFICATE OF CORRECTION

| | |
|---|---|
| PATENT NO. | : 11,407,051 B2 |
| APPLICATION NO. | : 16/083751 |
| DATED | : August 9, 2022 |
| INVENTOR(S) | : Manfred Gartner |

It is certified that error appears in the above-identified patent and that said Letters Patent is hereby corrected as shown below:

In the Claims

Column 22, Line 6, in Claim 13, delete "according" and insert -- according to --.

Column 22, Lines 66-67, in Claim 15, after "framework components" delete "(61A, 61B, 61C)".

Column 23, Line 1, in Claim 15, after "assembly stations" delete "with".

Signed and Sealed this
Twenty-fifth Day of October, 2022

Katherine Kelly Vidal
*Director of the United States Patent and Trademark Office*